Figure 1:
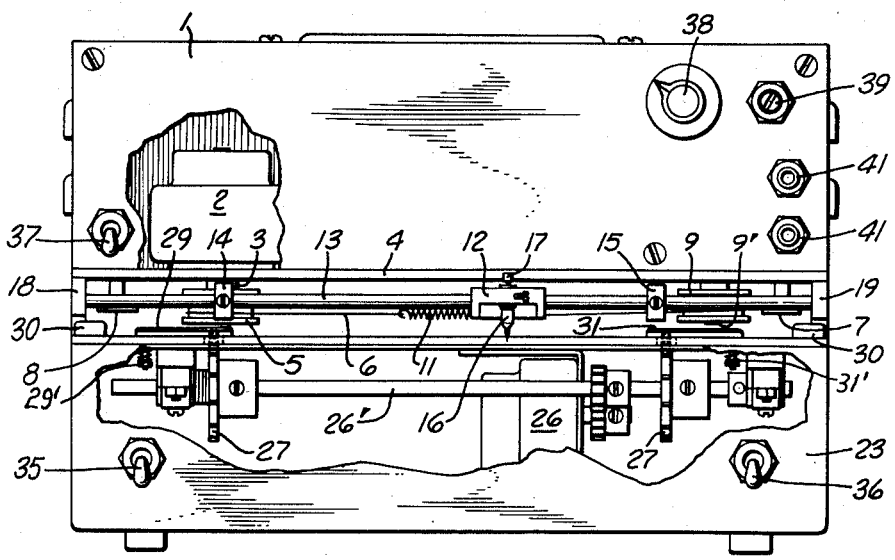

March 8, 1960 J. O. YEISER 2,927,838
GRAPHIC RECORDER
Filed Aug. 25, 1955 4 Sheets-Sheet 1

INVENTOR.
JOHN O. YEISER
BY
ATTORNEY

March 8, 1960  J. O. YEISER  2,927,838
GRAPHIC RECORDER
Filed Aug. 25, 1955  4 Sheets-Sheet 2
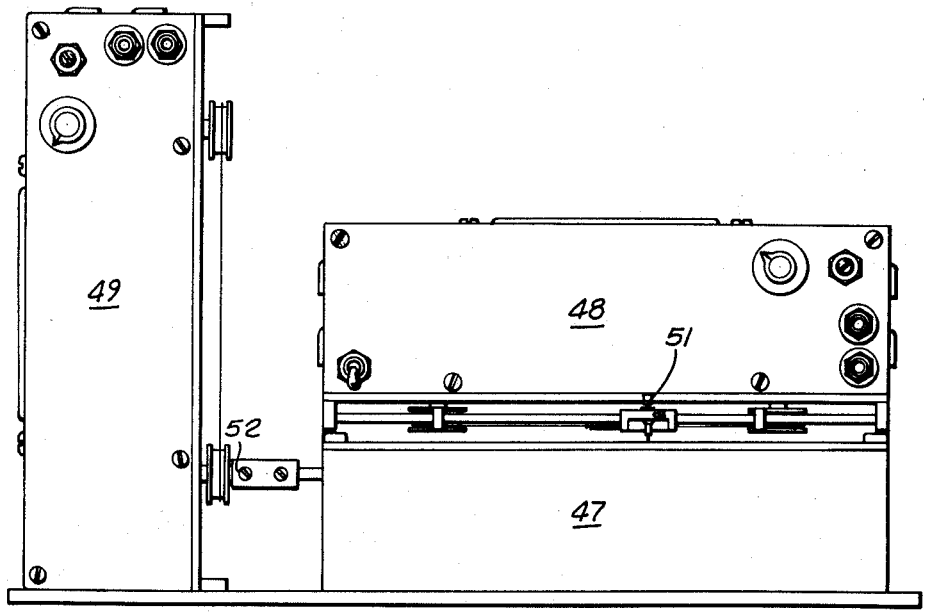
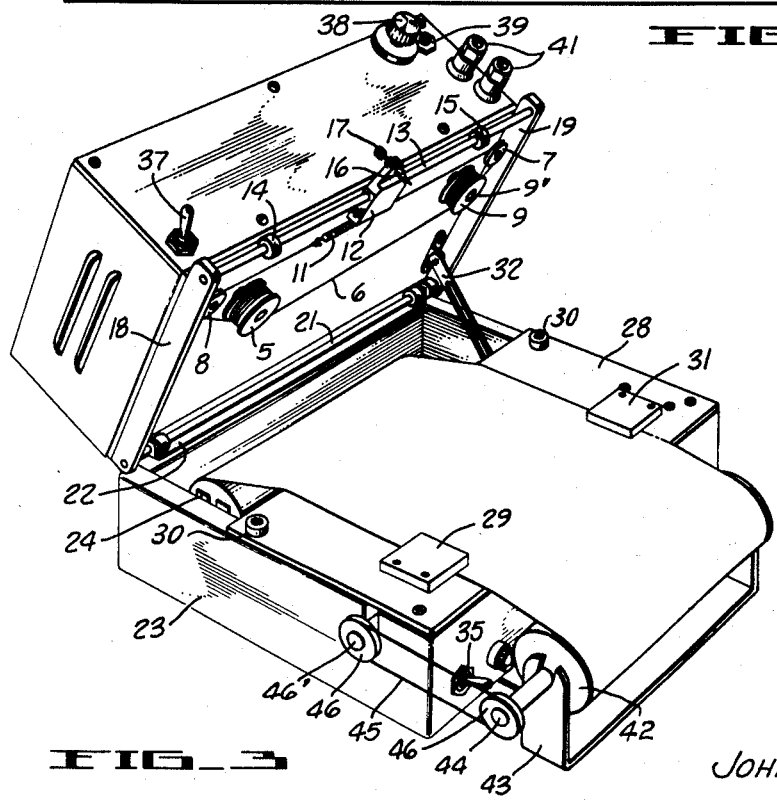
JOHN O. YEISER
INVENTOR
BY Paul S. Hunter
ATTORNEY March 8, 1960     J. O. YEISER     2,927,838
GRAPHIC RECORDER
Filed Aug. 25, 1955     4 Sheets-Sheet 3
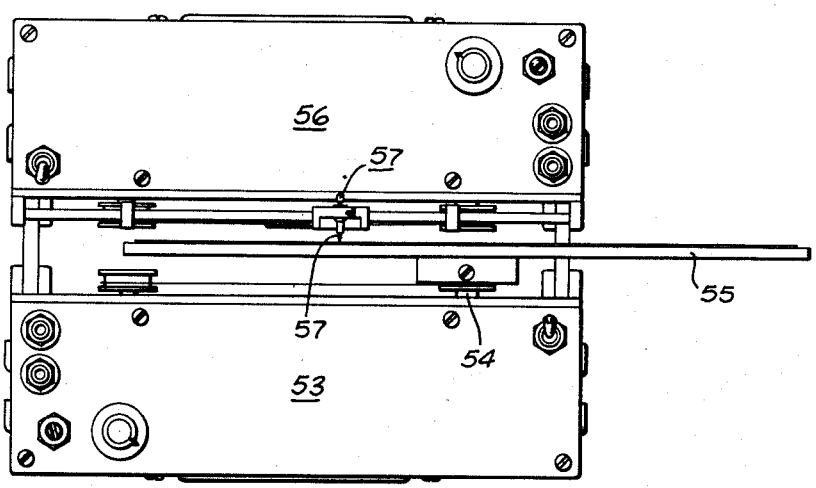
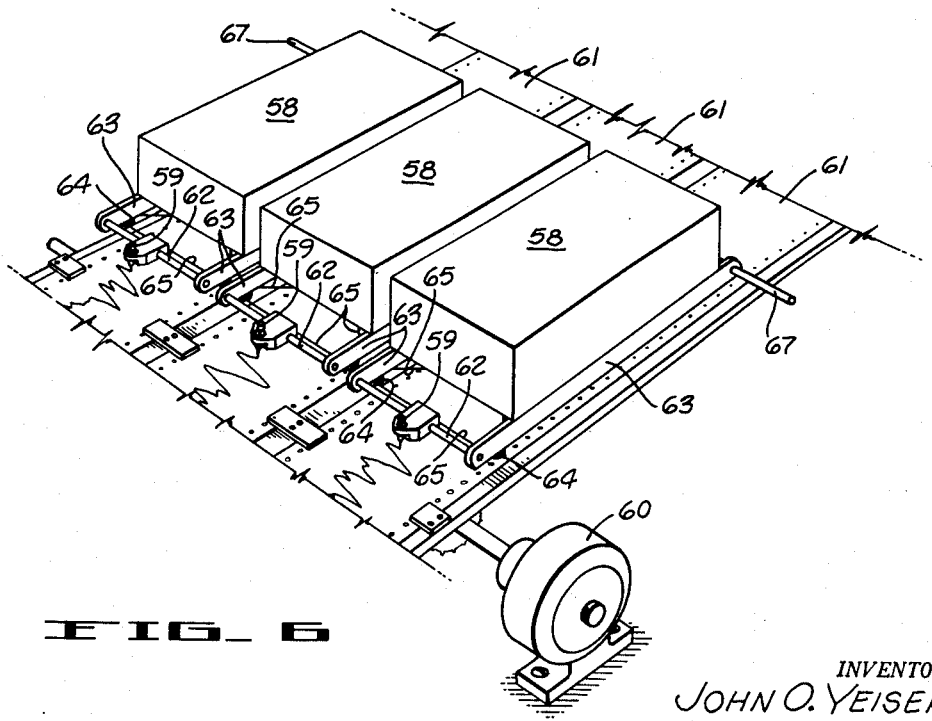
INVENTOR.
JOHN O. YEISER
BY
ATTORNEY March 8, 1960 J. O. YEISER 2,927,838
GRAPHIC RECORDER
Filed Aug. 25, 1955 4 Sheets-Sheet 4
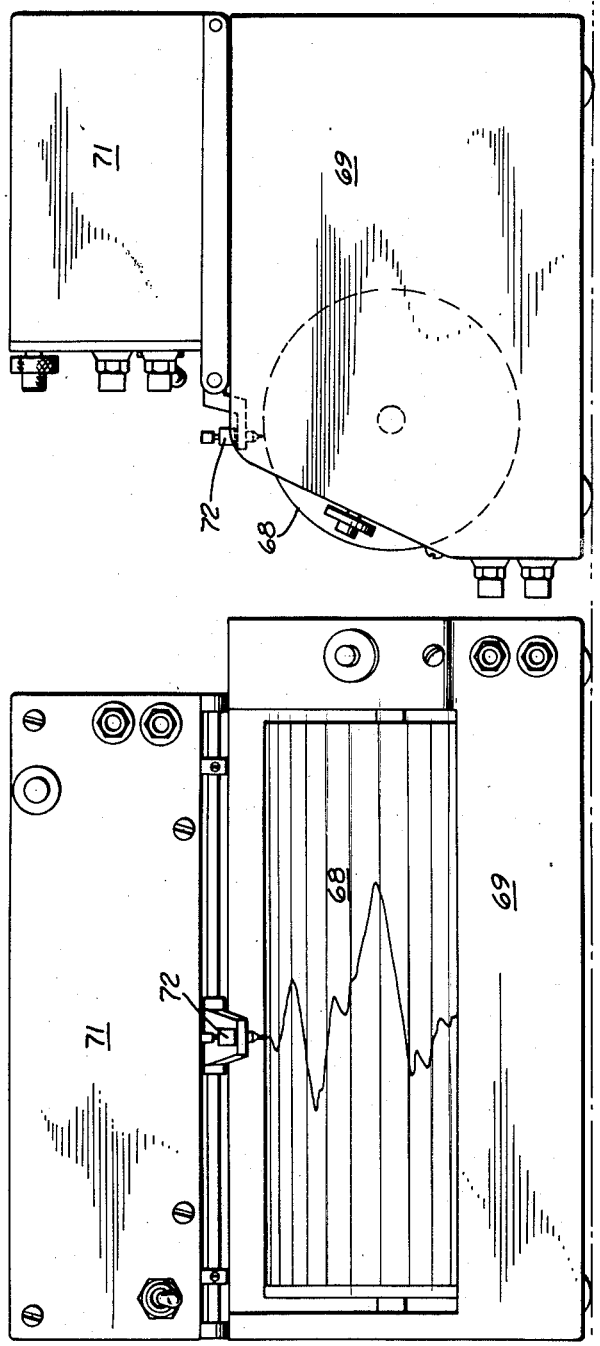
INVENTOR.
JOHN O. YEISER
BY
ATTORNEY

United States Patent Office 2,927,838
Patented Mar. 8, 1960

2,927,838

GRAPHIC RECORDER

John O. Yeiser, Palo Alto, Calif., assignor to Varian Associates, San Carlos, Calif., a corporation of California Application August 25, 1955, Serial No. 530,513

8 Claims. (Cl. 346—114)

This invention relates in general to graphic recorders and more particularly to a novel small, portable graphic recorder which is extremely flexible and versatile in performing various recording functions.

The object of the present invention is to provide a compact inexpensive graphic recorder with interchangeable components and accessories for rapid transformation from one recorder type to another and with separable servo apparatus and chart drive apparatus.

One feature of the present invention is the provision of a graphic recorder consisting in the main part of a first structure or chassis containing a chart paper holder and a chart paper drive mechanism, a second structure or chassis containing the electronic circuitry and servo mechanism for driving a recording pen or the like, the second chassis structure being mounted on the chart drive chassis structure yet readily separable therefrom.

Another feature of the present invention is the provision of a recorder structure of the immediately preceding type wherein the servo mechanism chassis is mounted on the chart drive chassis by means of a hinge arrangement whereby the servo mechanism and pen may be tilted back from contact with the chart paper.

Still another feature of the present invention is the provision, in a recorder of the immediately preceding type, of a plate or table top arrangement on the chart drive chassis over which the chart paper passes and on which the recording pen travels, the servo mechanism structure, when tilted away from the chart paper, rendering the table top accessible for making notes or the like on the chart paper.

Still another feature of the present invention is the provision of a novel graphic recorder device wherein the chart drive mechanism is contained in a structure separable from the electronic circuitry and associated servo mechanism and pen drive and wherein a second electronic servo mechanism structure may be readily coupled to the chart drive apparatus for converting a graphic recorder of a constant speed chart type to an X–Y recorder.

Still another feature of the present invention is the provision of a novel graphic recorder structure wherein a servo mechanism structure and associated pen and pen drive mechanism located in one chassis may be separably coupled to a second separate chassis containing a similar servo mechanism structure, the second servo structure driving a circular chart plate or holder.

These and other features and advantages of the present invention will become apparent from a perusal of the following specification taken in connection with the accompanying drawings wherein—

Figure 2:
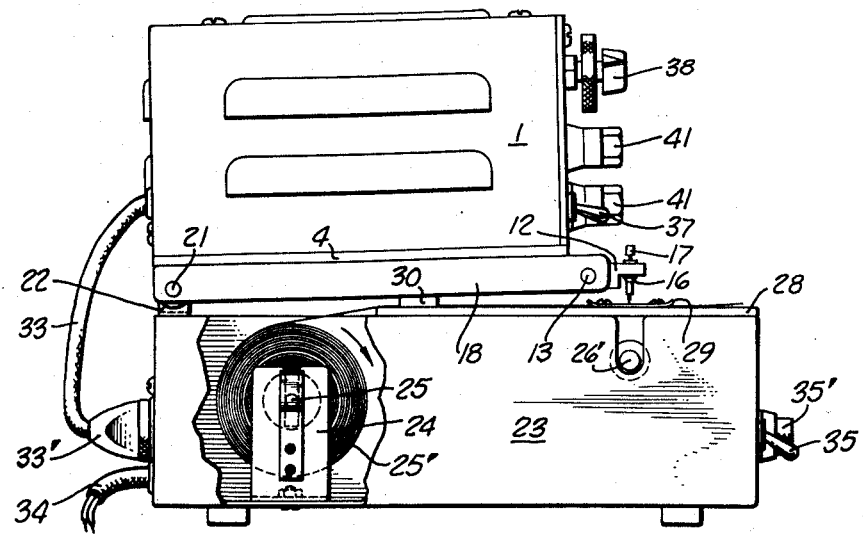

Fig. 1 is an elevation view partly cut away of a novel graphic recorder embodying the present invention, Fig. 2 is a side view partly cut away of the novel recorder shown in Fig. 1, this view showing a roll of chart paper mounted in the lower chassis, Fig. 3 is a perspective view of a recorder device similar to that of Fig. 1 shown with the servo mechanism and pen drive chassis tilted back from the paper drive chassis, Fig. 4 is a front elevation showing a graphic recorder assembly in which the chart drive mechanism comprises a second electronic servo mechanism structure similar to the pen drive servo mechanism, the second servo mechanism serving to drive the chart paper in response to a separate input signal, Fig. 5 is an elevation view showing two servo mechanisms mounted face to face with a circular chart plate driven from one electronic servo mechanism structure and a recording pen driven from the other, Fig. 6 is a perspective view of a plurality of pen-driving servo mechanism structures mounted in a bank so as to simultaneously record on a plurality of strip charts, Fig. 7 is a front elevation view of a graphic recorder device having a separate servo mechanism and pen driving chassis pivotally mounted on a chart drive structure, the chart drive being a roller type of drive on which the chart paper is secured and over which the pen moves in a longitudinal direction, and Fig. 8 is a side elevation view of the graphic recorder of Fig. 7.

Referring now to Figs. 1, 2 and 3, there is shown a graphic recorder embodying the present invention which includes a chassis 1 which serves to mount and enclose the amplifiers, lead circuits, driving motor, balancing potentiometer, etc., which go to make up the conventional type of servo mechanism structure. The servo drive motor 2 includes a shaft 3 which extends through the lower plate 4 of the chassis 1, a drive pulley 5 being fixedly secured on the end of the shaft 3. A pen driving cord or wire 6 is wound around the pulley 5 several times, the cord passing around idler pulleys 7 and 8 and being also wound around pulley 9. This latter pulley is securely affixed to the shaft 9' extending from the balancing potentiometer (not shown) which is enclosed within the chassis 1. One end of drive cord 6 is secured by means of a tension spring 11 to one side of a pen holder member 12, the opposite end of the cord being securely affixed to said pen holder at its other side. Pen holder 12 is slideably and pivotally mounted on a guide rod 13, there being fixedly mounted on the rod 13 two stop members 14 and 15 for limiting the length of travel of said pen holder 12. Secured in a lip extending from the pen holder 12 is an ink well 16 and associated pen 17.

Secured to the lower plate 4 of chassis 1 is a pair of side rails 18 and 19. The guide rod 13 is securely affixed in suitable openings in the front ends of said side rails. A hinge rod 21 is securely affixed in the rearward ends of said side rails 18 and 19. The hinge rod 21 is pivotally mounted in a U-shaped hinge bracket 22 which is affixed on the rear edge of a chart drive chassis 23.

Mounted within the rear portion of chassis 23 is a U-shaped bracket 24 adapted to carry a chart paper spindle 25 adapted to carry a roll of chart paper 25' (Fig. 2). The spindle may be slipped into or out of the bracket 24 through the top of the chassis. Also secured within the chassis 23 is a paper drive apparatus including a motor 26, drive shaft 26' and associated sprocket wheels 27. The chassis 23 has a cover or plate 28 thereon having two paper hold-down members 29 and 31 mounted on the upper surface, these members being resiliently held down by spring load members 29' and 31', respectively. These members cooperate to hold the paper on the surface of plate 28 while it is driven by the sprocket wheels 27 in accordance with the speed of the sprocket drive motor 26.

In operation, the chart paper may be easily loaded into the chart drive chassis by tilting the servo mechanism chassis 1 back, the distance of movement of the servo mechanism being determined by the sliding bracket 32 (Fig. 3). The chart paper then fits through the opening in the top rear of the chassis 23, the paper roll spindle 25 slipping into the bracket 24. The end of the paper is then drawn up over the plate 28 and is fitted under the paper guides 29 and 31 where the sprocket wheels 27 engage suitable perforations in the outer edges of the chart paper. Two rubber cushions 30 are provided for engaging the side rails 18 and 19. The front end of the pen holder 12 is weighted so that the pen pivots on shaft 13 and bears against the chart paper when the chassis 1 is lowered. The servo mechanism chassis 1 has a separate cord 33 and plug 33' which may be plugged into the chart drive chassis, which in turn is connected by cord 34 to a suitable standard source of power, or the servo mechanism may be plugged into the source directly. The main power switch 35 for the chart drive, and for the servo mechanism when plugged into the chart drive mechanism, is located on the front of the chart drive chassis along with a fuse holder 35'. The chart drive motor has a separate off-on switch 36 in the chart drive chassis. The servo mechanism has a separate off-on switch 37 in the servo mechanism chassis which controls the pen driving motor. Suitable controls such as a zero setting adjust control 38, which sets the pen zero position at any desired position along the shaft 13, and a damping control 39 for selecting range of driving impedances are located on the servo mechanism chassis which also includes input terminals 41. The chart drive motor drives the paper at a constant speed which depends upon the speed and gearing of the drive motor 26 and sprocket apparatus. The signal to be recorded is coupled to the servo mechanism through input terminals 41, the servo mechanism operating in a wellknown manner to position the pen 17 longitudinally along the pen rod 13 in accordance with the amplitude of the incoming signal.

In one embodiment of this invention recently constructed, the chart drive speed was 4 in. per minute, response time of pen 2.5 sec. full-scale, sensitivity 100 millivolts full-scale, measurement accuracy 1%, and maximum pen travel 7 in.

If it is desired to make notes of any kind on the chart paper during operation, the servo mechanism chassis 1 may be tilted back from the lower chassis 23 such that the plate 28 may serve as a table top for writing on the chart paper. If desired, a chart pickup roller 42 (Fig. 3) may be employed for rolling up the chart paper after the signal has been recorded. In such case a U-shaped bracket 43 is mounted on and positioned in front of the chart drive chassis 23. The take-up spindle 44 is rotatably mounted in the bracket 43 and is suitably coupled, as by a driving cord 45 and pulleys 46, to an extension 46' on the shaft 26' of the chart drive motor 26, the take-up spindle 44 serving to wind up the paper as it comes off the recorder.

Referring now to Fig. 4, there is shown a combination of a chart drive chassis 47 and two servo mechanism chassis 48 and 49, one servo mechanism unit 48 serving to drive a recording pen 51 while the paper drive shaft in the chart drive chassis 47 is coupled through coupler 52 to the servo motor in the second servo unit 49, which is placed on its side. The second servo chassis 49 could be mounted flat and coupled to the chart drive through a flexible or geared coupling mechanism. A first signal is transmitted to the first pen-driving servo unit 48 while the servo motor in the second servo unit 49 is driven by a second signal input, the chart paper thus being driven in accordance with a second input signal. In this manner there is produced a convenient X–Y recorder.

Referring to Fig. 5 there is shown a novel recorder structure wherein two servo mechanism units are utilized, the lower servo mechanism unit 53 being turned face up so that the shaft 54 on the drive motor may mount a circular plate 55 which is adapted to carry a circular polar chart or graph. The top servo mechanism unit 56 controls the longitudinal movement of the recording pen 57 which travels over a radius of the plate 55. The pen 57 travels in response to a first signal input to the upper servo unit while the circular plate 55 travels at a speed dependent on a second signal input to the lower servo unit 53. If a constant speed is desired for the chart plate, a chart drive chassis such as that shown in Fig. 1 may be utilized, the chart drive motor therein being coupled to a shaft which extends upward through the top plate of the chart drive chassis and mounts a circular chart plate.

Referring to Fig. 6, there is shown a plurality of servo mechanism units 58, each servo mechanism unit serving to drive an associated recording pen 59. The servo mechanism units are aligned in a bank in cooperation with an equal plurality of chart strips 61 which pass under the recording pen 59 at a speed determined by the associated driving motor 60 connected to the chart drive sprockets. Each servo mechanism unit may be coupled to a separate input signal source, the different signals being recorded simultaneously on the different chart strips. In these particular servo mechanism units the pen 59 has been mounted on a pen guide rod 62 which runs parallel to the short side of the servo chassis 58, the guide rod 62 being mounted in rails 63 mounted at the two longer sides of the chassis. Idler pulleys 64 are mounted on the rails 63 and carry the driving cord 65 connected to the pen holder 66. The servo mechanism units are pivotally mounted at the rear ends of the rails 63 on a common hinge shaft 67.

There is shown in Figs. 7 and 8 a graphic recorder utilizing a chart paper drum 68 which is mounted in a lower chassis 69 and is rotatably driven by a suitable chart drive motor (not shown). The servo mechanism unit 71 including recording pen 72 is pivotally mounted at the rearward edge of the chart drum chassis. The pen holder member is driven longitudinally along the upper surface of the chart drum responsive to the input signals to be recorded.

Since many changes could be made in applicant's embodiments of the present invention, it is intended that all matter contained in the above description or shown in the accompanying drawings shall be interpreted as illustrative and not in a limiting sense.

What is claimed is:

1. A graphic recorder comprising a first chassis member, a servo mechanism unit mounted in said first chassis member including a servo motor and a balancing potentiometer each having shafts integral therewith, said shafts extending outwardly through openings in the lower surface of said chassis member, a first pulley mounted on said servo motor shaft and a second pulley mounted on said potentiometer shaft, both outside said chassis member, a pair of side rails mounted on the lower surface of said chassis extending from the rear and protruding slightly beyond the front side of said chassis, a pen holder guide rod affixed in the front ends of said side rails extending parallel to the front of said chassis, a recording pen and pen holder slideably mounted on said guide rod, a pair of idler pulleys mounted on said chassis near the ends of said guide rod, pen holder driving means connected to said pen holder and passing around said idler pulleys and said servo motor pulley and potentiometer pulley whereby said pen and potentiometer are driven from said servo motor, a second chassis member, a chart paper drive mechanism mounted in said second chassis, a chart paper holding means mounted in said second chassis for holding chart paper, said chart drive mechanism arranged to drive said paper, and a hinge rod secured at the rearward ends of said side rails for pivotally mounting said first chassis member on the rear of said second chassis whereby said recording pen contacts said chart paper when said first chassis is tilted down on said second chassis.

2. A graphic recorder as claimed in claim 1 including a plate secured on the top of said second chassis whereby recorder chart paper may pass over the plate, said pen moving over said plate for recording on the chart paper.

3. A graphic recorder as claimed in claim 2 wherein the chart drive mechanism in said second chassis comprises a pair of sprocket wheels, said sprocket wheels extending through openings in said plate for cooperation with sprocket openings in said graph paper.

4. A graphic recorder device as claimed in claim 1 wherein the chart drive mechanism in said second chassis comprises a cylindrical roller adapted to carry a sheet of chart paper, said pen arranged to move over the surface of said roller for recording on said chart paper.

5. A graphic recorder as claimed in claim 1 further comprising a second servo mechanism unit coupled to said chart paper drive mechanism thereby enabling X-Y recorder operation.

6. A graphic recorder as claimed in claim 5 wherein said second servo mechanism unit is mounted in a third chassis member and further comprising means for coupling said second servo mechanism unit to the chart paper drive mechanism mounted in said second chassis.

7. A graphic recorder as claimed in claim 1 wherein said chart drive mechanism further includes a circular plate rotatably mounted on said second chassis and wherein said chart paper holding means is adapted to fasten polar graph paper on said circular plate thereby enabling polar recorder operation.

8. A graphic recorder as claimed in claim 7 further comprising a second servo mechanism unit mounted in said second chassis and coupled to said chart paper drive mechanism.

References Cited in the file of this patent

UNITED STATES PATENTS

| | | |
|---|---|---|
| 1,864,566 | Walter | June 28, 1932 |
| 2,321,273 | Belcher | June 8, 1943 |
| 2,509,185 | Eckel | May 23, 1950 |
| 2,598,096 | Bailly | May 27, 1952 |
| 2,637,619 | Stein | May 5, 1953 |
| 2,655,427 | Alden | Oct. 13, 1953 |
| 2,669,500 | Och et al. | Feb. 16, 1954 |
| 2,702,736 | Niemann | Feb. 22, 1955 |
| 2,719,947 | Reason | Oct. 4, 1955 |
| 2,784,048 | Strimel | Mar. 5, 1957 |